(12) United States Patent
Heckerman et al.

(10) Patent No.: US 7,370,002 B2
(45) Date of Patent: May 6, 2008

(54) MODIFYING ADVERTISEMENT SCORES BASED ON ADVERTISEMENT RESPONSE PROBABILITIES

(75) Inventors: David E. Heckerman, Bellevue, WA (US); Martin Luo, Redmond, WA (US); Guy Shani, Kibbutz Beit Kama (IL); Mahbubul Alam Ali, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1227 days.

(21) Appl. No.: 10/163,056

(22) Filed: Jun. 5, 2002

(65) Prior Publication Data

US 2003/0229531 A1    Dec. 11, 2003

(51) Int. Cl.
*G06F 17/60* (2006.01)
(52) U.S. Cl. .......................................... 705/10; 705/14
(58) Field of Classification Search .................. 705/10, 705/14

See application file for complete search history.

(56) References Cited

U.S. PATENT DOCUMENTS

| | | | |
|---|---|---|---|
| 5,373,773 A * | 12/1994 | Groves | 89/1.11 |
| 6,314,451 B1 * | 11/2001 | Landsman et al. | 709/203 |
| 6,430,539 B1 * | 8/2002 | Lazarus et al. | 705/10 |
| 6,591,248 B1 * | 7/2003 | Nakamura et al. | 705/14 |
| 6,836,773 B2 * | 12/2004 | Tamayo et al. | 707/6 |
| 6,901,406 B2 * | 5/2005 | Nabe et al. | 707/102 |
| 7,003,476 B1 * | 2/2006 | Samra et al. | 705/10 |
| 7,039,599 B2 * | 5/2006 | Merriman et al. | 705/14 |
| 2002/0174182 A1 * | 11/2002 | Wilkinson et al. | 709/205 |
| 2003/0046161 A1 * | 3/2003 | Kamangar et al. | 705/14 |
| 2003/0055729 A1 * | 3/2003 | Bezos et al. | 705/14 |
| 2003/0110112 A1 * | 6/2003 | Johnson et al. | 705/36 |
| 2003/0139963 A1 * | 7/2003 | Chickering et al. | 705/10 |
| 2006/0230053 A1 * | 10/2006 | Eldering | 707/101 |

OTHER PUBLICATIONS

Thomas, A survey of credit and behavioural scoring: forecasting financial risk of lending to consumers, Int. J. Forecasting 16 (2000) 149-172.*
Apte et al., Segmentation-Based Modeling for Advanced Targeted Marketing, Proceedings of the seventh ACM SIGKDD international conference on Knowledge discovery and data mining 2001, San Francisco, California Aug. 26-29, 2001.*

(Continued)

*Primary Examiner*—Tariq R. Hafiz
*Assistant Examiner*—Justin M Pats
(74) *Attorney, Agent, or Firm*—Workman Nydegger

(57) ABSTRACT

Advertisement response probabilities are utilized to alter advertisement scores. A plurality of possible advertisements is accessed from, for example, an advertisement database or advertisement pipeline. A response probability for each advertisement is determined. A response probability may be a probability that a user will "click," or otherwise select an advertisement. Advertisements may be associated with probabilistic prediction models that take advertisement recipient attribute values as inputs and provide a probability distribution as output. A score associated with each of the possible advertisements is altered based on the response probability for each of the advertisements. Statistical prediction is used to determine how scores are to be altered. Advertisements with response probabilities less than a mean probability may have associated scores decreased. Conversely, advertisements with response probabilities greater than a mean probability may have associated scores increased.

27 Claims, 5 Drawing Sheets

OTHER PUBLICATIONS

Natarajan and Pednault, Segmented Regression Estimators for Massive Data Sets, Second SIAM international conference on data mining, Apr. 11-13, 2002.*

Chickering and Heckerman, A Decision Theoretic Approach to Targeted Advertising, Microsoft Research Publications, Feb. 2000.*

Madeira and Sousa, Comparison of target selection methods in direct marketing, eunite 2002, Sep. 19-21, 2002, Algarve, Portugal, p. 333-338.*

Informative Narrowcasting with Consumer Search, R. Dewan et al., Proceedings of the 35th Annual Hawaii International Conference on System Sciences. Publ. by IEEE Comput. Soc., Los Alamitos, CA, USA, 2002, pp. 1-6.

Targeted Advertising . . . and Privacy Too, A. Juels, Topics in Cryptology—CT-RSA 2001. The Cryptographers' Track at RSA Conference 2001 Proceedings (Lecture Notes in Computer Science), Publ. by Springer-Verlag, Berlin, Germany, 2001, vol. 2020, pp. 408-424.

Identifying Locations for Targeted Advertising on the Internet, A. Bhatnagar and P. Papatla, International Journal of Electronic Commerce, Publ. by M.E. Sharpe, USA, Spring 2001, vol. 5, No. 3, pp. 23-44.

An Entropy Approach to Unintrusive Targeted Advertising on the Web, J.A. Tomlin, Computer Networks, Publ. by Elsevier, Netherlands, Jun. 2000, vol. 33, No. 1-6, pp. 767-774.

An MFR-Basedweb Log Clustering Approach and its Application, Lin Yuh-Chi and P. Hadingham, Proceedings of the International ICSC Congress on Computational Intelligence Methods and Applications, Publ. by ICSC Academic Press, Zurich, Switzerland, 1999.

* cited by examiner

MODIFYING ADVERTISEMENT SCORES BASED ON ADVERTISEMENT RESPONSE PROBABILITIES

BACKGROUND OF THE INVENTION

1. The Field of the Invention

The present invention relates to targeted advertising. More specifically, the present invention relates to systems, methods, and computer program products for modifying an advertisement score based on a probability that a user will respond to the advertisement, the advertisement score being indicative of whether the advertisement should be presented.

2. Background and Relevant Art

Advertisers often present advertisements to users of networked computer systems (e.g., Internet-connected computer systems) in hopes that the users of the networked computer systems will become interested in the advertised products. At times, advertisers may present advertisements that are viewed by users and as a result generate user interest in the advertised product. However, at other times, and perhaps more frequently, viewed advertisements generate little, if any, user interest in advertised products. In some cases, users simply ignore advertisements, not viewing them at all.

In the past, the reduced effectiveness of advertisements presented on computer networks was in part due to advertisers having reduced amounts of contextual data associated with possible advertisement recipients. In a broadcast or cable television environment, an advertiser may, at the very least, have contextual data on the channel that will present an advertisement. In many cases, an advertiser will also have contextual data on the programming and time of day during which an advertisement will be presented. However, computer networks, such as the Internet, may include voluminous amounts of information, only a small portion of which may be of interest to a particular user. An advertiser may have had no way to determine what a particular user is interested in and thus present appropriate advertisements.

As such, a variety of advertising techniques have been developed to "target" users on a computer network. These targeting techniques are designed to present advertisements that, if viewed, have increased chances of generating user interest in an advertised product. Conventional targeting techniques often associate advertisements with advertisement scores, where advertisements with higher scores are presented to a user before advertisements with lower scores. An advertising server may generate a score for a number of advertisements and then present the advertisements with the higher scores to a user.

An advertisement server may use deterministic rules when generating advertisement scores. Each advertisement may begin with a base score that is modified as successive rules are applied. A deterministic rule may be, for example, "if a user is less than age 30, then increase the score for this advertisement." The advertisement server may access user data, for example, data contained in a user profile, to determine how rules are applied. If the advertisement server accessed user data indicating that a particular user is age 25, application of the previous rule would result in an increase in associated advertisement scores.

A series of rules may be applied based on different portions of user data, for example, age, sex, and income, to cause an advertisement score for a particular group of users to be increased or decreased. This is beneficial, as an advertiser may configure a series of rules to increase advertisement scores for particular groups of users the advertiser believes are more likely to be interested in a particular product. Likewise, an advertiser may configure a series of rules to decrease advertisement scores for particular groups of users the advertiser believes are less likely to be interested in a particular product.

Current targeting techniques are beneficial for increasing the chances of presenting advertisements that will generate user interest. However, current targeting techniques fail to consider the probability that a potentially interested user will actually respond to an advertisement by buying the advertised product or selecting the advertisement ("clicking through") to view additional information. For example, it may be that a user is interested in an advertised product but for some reason has a decreased probability of responding to an advertisement associated with the product. Presenting advertisements to users who have decreased probabilities of responding to the advertisements results in inefficient use of advertisement server resources. Additionally, a user with a reduced probability for responding to an advertisement may find presentation of such an advertisement undesirable.

Therefore, what are desired are systems, methods, and computer program products, for modifying an advertisement score based on a probability that a user will respond to the advertisement.

BRIEF SUMMARY OF THE INVENTION

The principles of the present invention provide for utilizing response probabilities, such as, for example, buying an advertised product or selecting an advertisement to view additional information, to modify a score that indicates whether or not to present the advertisement to the user.

In accordance with the present invention, a number of advertisements are accessed. Advertisements may be accessed from a list or database of possible advertisements or may be received as input from an advertisement pipeline. Each advertisement is associated with a probabilistic predictive model that maps a set of advertisement recipient attribute-values to a response (or click) probability. In some cases, the probabilistic predictive model utilizes a decision tree, where each node in the decision tree is logically attached to one or more other nodes. A root node is attached to other nodes (intermediate nodes and/or leaf nodes) that are directly beneath the root node. Intermediate nodes are attached to a node (root node or other intermediate node) that is directly above the intermediate node and to other nodes (intermediate nodes and/or leaf nodes) that are directly beneath the intermediate node. Leaf nodes are attached to a node (root node or intermediate node) that is directly above the leaf node.

Each root node and intermediate node may include decision logic that causes another intermediate node or leaf node beneath the root node or intermediate node to be accessed. Decision logic may cause another node to be accessed based on user information, such as age, sex, or occupation of a user. For example, a root node may include decision logic to access a first intermediate node if a user's age is less than 18 and to access a second intermediate node if a user's age is 18 or greater. Decision logic may be configured so that a series of intermediate nodes are accessed before reaching a leaf node.

A response probability for each advertisement in the plurality of possible advertisements is determined. A response probability may represent a probability that a user will buy a product or select an advertisement by "clicking" on the advertisement. A decision tree may be utilized to determine response probabilities for advertisements. Starting at the root node and continuing through one or more intermediate nodes, decision logic may analyze user information associated with a user, such as information from a user profile, and cause a leaf node to be accessed. Each leaf node may store a probability value between zero and one. Zero represents that a user will never respond to an advertisement and one represents that a user will always respond to an advertisement. A probability of 0.18, for example, may represent an 18% chance that a user will respond to an advertisement. The accessed leaf node may include a value that represents the probability that the user associated with the analyzed user information would respond to the advertisement.

For example, a user profile may contain the following information for a user: age-18, sex-male, and occupation-student. A decision tree for a particular advertisement may be utilized to determine the probability that the user associated with the user profile would respond to the particular advertisement. Decision logic at a root node may analyze age information to cause one of a plurality of first intermediate nodes to be accessed. For users who are age 18, a particular first intermediate node may be accessed. Decision logic at the particular first intermediate node may analyze sex information to cause one of a plurality of second intermediate nodes to be accessed. For users who are male, a particular second intermediate node may be accessed. Decision logic at the particular second intermediate node may analyze occupation information to cause one of a plurality of leaf nodes to be accessed. For users who are students, a particular leaf node may be accessed. The particular leaf node may include the probability that an 18-year-old male student would respond to the particular advertisement.

Based on the response probability for each of the possible advertisements, a score associated with each of the possible advertisements is altered. The score for each advertisement may be a score that indicates whether or not to present the advertisement to the user. A score may be received from an external module that is part of an advertisement pipeline. When altering a score, the mean probability for responding to an advertisement (i.e. a possible weighted average of the probabilities of all the leaf nodes in a decision tree) may be calculated. The deviation of a particular leaf node's probability from the mean probability may be indicative of how a score is to be altered.

For example, if a particular probability of responding to an advertisement is below the mean probability, a score may be multiplied by a value that decreases the score of the advertisement. Thus, the chance of presenting an advertisement to a user is decreased where the probability that the user will respond to the advertisement is below average. On the other hand, if a particular probability of responding to an advertisement is above the mean probability, a score may be multiplied by a value that increases the score of the advertisement. Thus, the chance of presenting an advertisement to a user is increased where the probability that the user will respond to the advertisement is above average. Different ranges of deviation (e.g. some number of standard deviations from the mean) may result in different multiplicative factors being applied to a score. Multiplicative factors for altering a score may be calculated from values in a decision tree and/or may be user-configurable.

Modifying advertisement scores based on response probabilities increases the chances of presenting advertisements a user will respond to and decreases the chances of presenting advertisements a user will not respond to. This promotes conservation of resources in computer systems that present advertisements, as there is a decreased chance such resources will be used to present advertisements that will not be responded to. Further, the chances of presenting undesirable advertisements to a user are also decreased.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
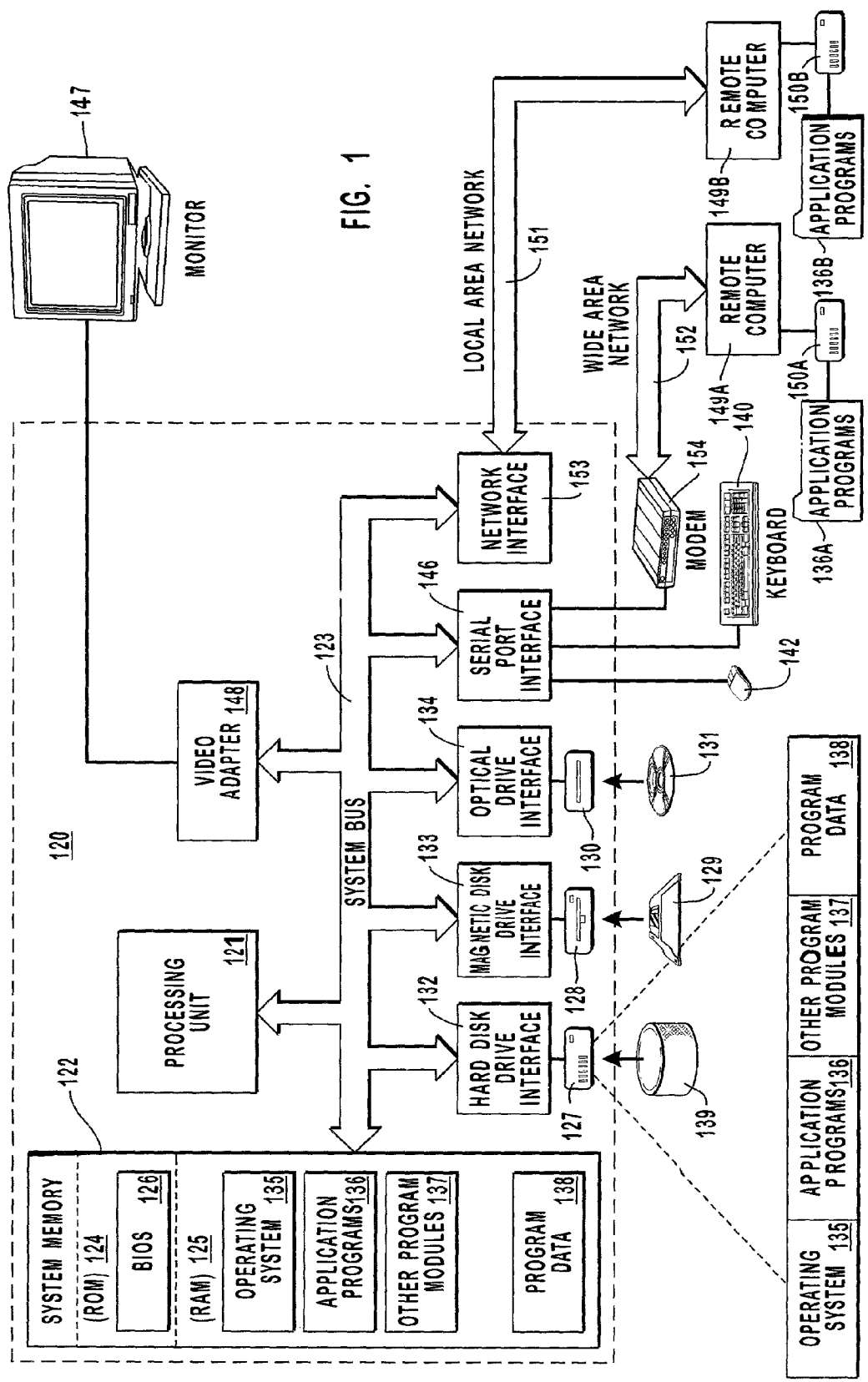
FIG. 1 illustrates an example of a computer system that provides a suitable operating environment for the present invention.

The present invention extends to systems, methods, and computer program products for modifying advertisement scores based on response probabilities. A plurality of advertisements is accessed and a response probability for each advertisement in the plurality is determined. An associated advertisement score for each advertisement is modified based on the corresponding response probability for each advertisement.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data with each other.

When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including personal computers, laptop computer, hand-held devices, multi-processor systems, microprocessor-based or programmable consumer electronics, network PCs, minicomputers, mainframe computers, mobile telephones, PDAs, pagers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, an example system for implementing the invention includes a general-purpose computing device in the form of computer system 120, including a processing unit 121, a system memory 122, and a system bus 123 that couples various system components including the system memory 122 to the processing unit 121. Processing unit 121 may execute computer-executable instructions designed to implement features of computer system 120, including features of the present invention. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer system 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer system 120. Although the example environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer system 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer system 120 may operate in a networked environment using logical connections to one or more remote computers, such as remote computers 149A and 149B. Remote computers 149A and 149B may each be another personal computer, a server, a router, a network PC, a peer device, or other common network node, and typically include many or all of the elements described above relative to the computer system 120, although only memory storage devices 150A and 150B and their associated application programs 136A and 136B are illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer system 120 is connected to the local network 151 through a network interface or adapter 153. When used in a WAN networking environment, the computer system 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer system 120, or portions thereof, may be stored in the remote memory storage device. It will be appreciated that the network connections shown are merely examples and other means of establishing communications over wide area network 152 may be used.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In this description and in the following claims, a "logical communication path" is defined as any communication path that may enable the transport of electronic data between two entities such as computer systems or modules. The actual physical representation of a communication path between two entities is not important and may change over time. A logical communication path may include portions of a system bus, a local area network, a wide area network, the Internet, combinations thereof, or portions of any other path that may facilitate the transport of electronic data. Logical communication paths may include hardwired links, wireless links, or a combination of hardwired links and wireless links. Logical communication paths may also include software or hardware modules that condition or format portions of data so as to make them accessible to components that implement the principles of the present invention. Such components may include, for example, proxies, routers, firewalls, or gateways. Logical communication paths may also include portions of a Virtual Private Network ("VPN").

In this description and in the following claims, a "response" is defined as any action taken by an advertisement recipient that indicates the advertisement recipient has shown some interest in an advertised product. Advertisement recipients may perform actions indicating different levels of interest in an advertised product. For example, an advertisement recipient may show a higher level of interest in an advertised product by buying the product. On the other hand an advertisement recipient may show a lower level of interest by selecting an advertisement (e.g. "clicking through") to view more information about an advertised product. It should be understood that response is defined, generally, to cover different levels of advertisement recipient interest.

In accordance with the present invention, probability determination and score alteration modules as well as associated data, including user profiles and advertisements may be stored and accessed from any of the computer-readable media associated with computer system 120. For example, portions of such modules and portions of associated program data may be included in operating system 135, application programs 136, other program modules 137 and/or program data 138, for storage in system memory 122. Portions of such modules and associated program data may also be stored in any of the mass storage devices previously described, for example hard disk 139. Execution of such modules may be performed in a distributed environment as previously described.

Figure 2:
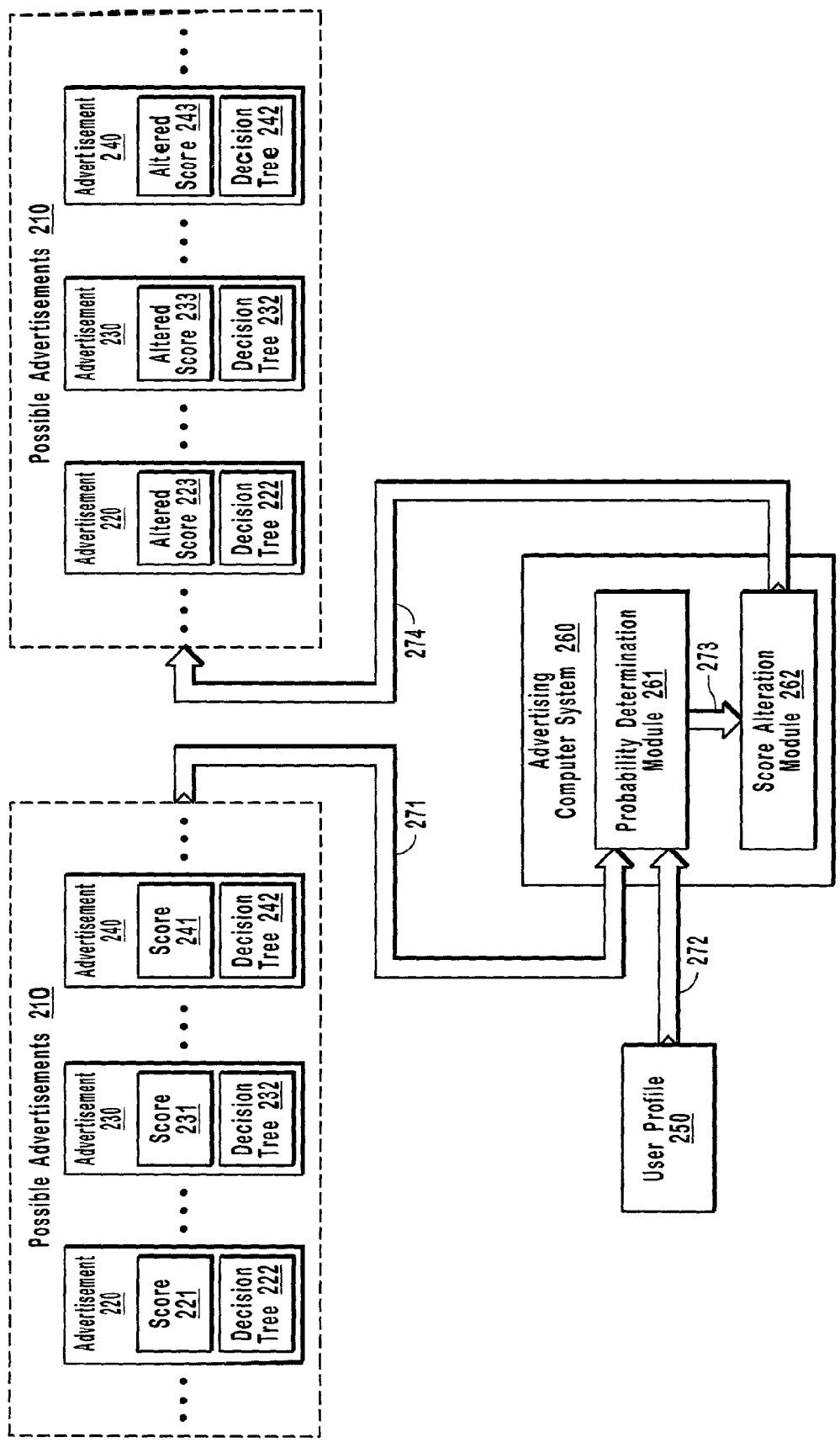
FIG. 2 illustrates an example of some of the functional components that may facilitate modifying advertisement scores based on response probabilities.

FIG. 2 illustrates some of the functional components that may facilitate modifying advertisement scores based on response probabilities. FIG. 2 includes advertising computer system 260 that may be a flexible general-purpose computer system configured to implement the principles of the present invention. As illustrated, advertising computer system 260 includes probability determination module 261, which may be configured to determine response probabilities for advertisements, and score alteration module 262, which may be configured to alter advertisement scores based on response probabilities.

Figure 3:
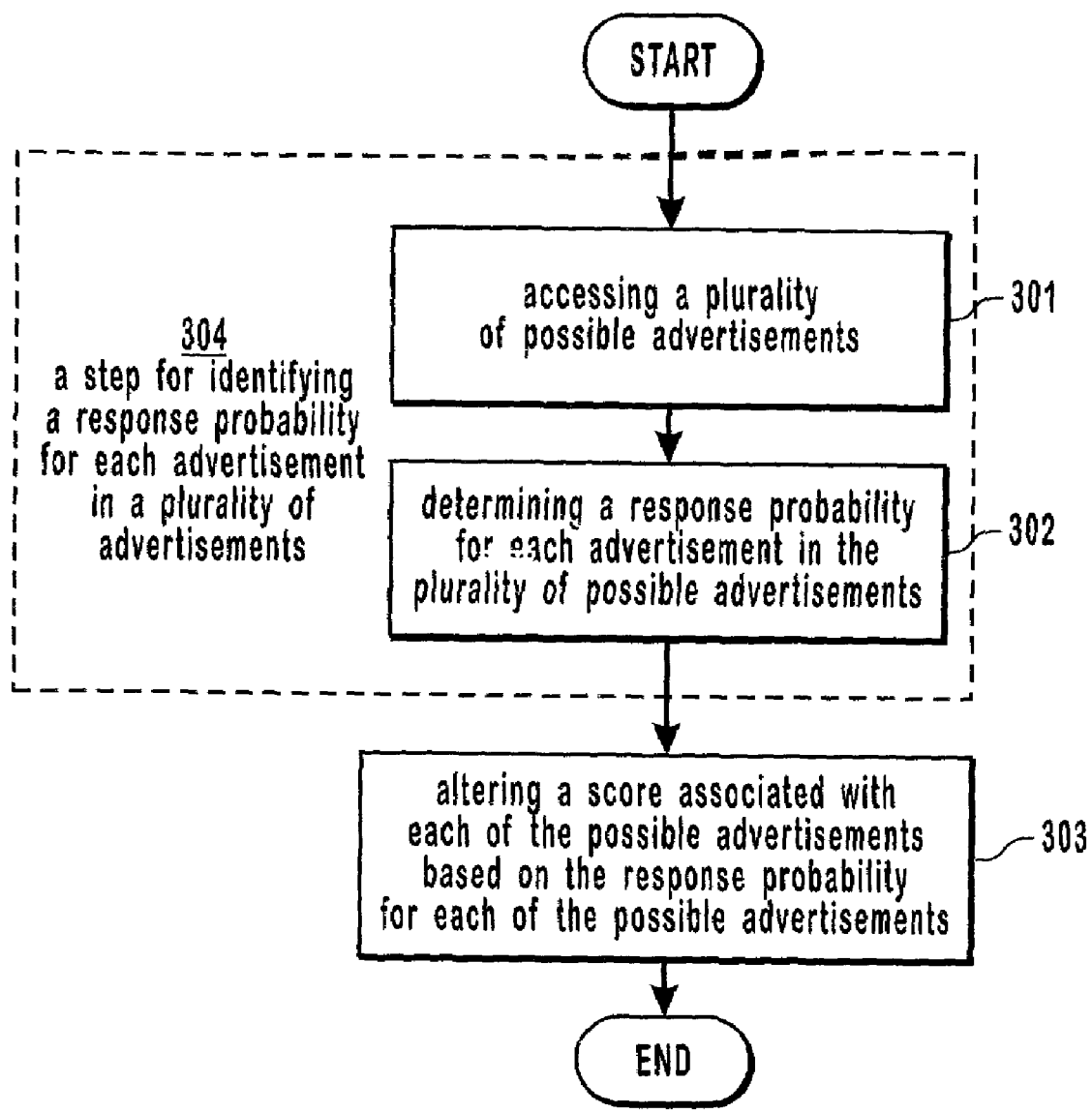
FIG. 3 is a flow diagram illustrating an example of a method for modifying advertisement scores based on response probabilities.

FIG. 3 is a flow diagram illustrating an example of a method for modifying advertisement scores based on a response probability. The method in FIG. 3 will be discussed with reference to the functional components included in FIG. 2.

The method in FIG. 3 may begin with a step for identifying a response probability for each advertisement in a plurality of advertisements. Response probabilities may be accessed from a database of response probabilities or may be received via an advertisement pipeline. Step 304 may include a corresponding act of accessing a plurality of possible advertisements (act 301). Possible advertisements may be accessed from an advertisement database or received via an advertisement pipeline. Each advertisement in the possible advertisements may be associated with a probabilistic predictive model, such as, for example, decision trees, naive Bayes, or logistical regression, that includes one or more response probabilities.

As shown in FIG. 2, possible advertisements 210 are received at probability determination module 261 via logical communication path 271. Possible advertisements 210 represents a plurality of advertisements that may, if appropriate, be presented to an advertising recipient. Each advertisement in possible advertisements 210 includes a score and a decision tree, for example, advertisement 220 includes score 221 and decision tree 222. Where three consecutive periods are illustrated in FIG. 2 (i.e. an ellipses), this represents that other advertisements may precede the illustrated advertisements or other advertisements follow the illustrated advertisements.

Logical communication path 271 may be a portion of an advertisement pipeline. Possible advertisements 210 may have been output from a previous module in the advertisement pipeline before being received at probability determination module 261.

A score associated with an advertisement may be a numerical value that indicates whether or not an advertisement will be presented to a user. Advertisements associated with higher scores may be presented before advertisements associated with lower scores. After scores are appropriately altered, a presentation module may present a specified number of advertisements associated with higher scores, while other advertisement associated with lower scores are not presented. It should be understood that the use of numerical values to determine which advertisements are presented is merely an example. It would be apparent to one skilled in the art, after having reviewed this description, that a variety of different scoring values may be utilized to determine which advertisements are presented.

A decision tree associated with an advertisement may include a root node, one or more intermediate nodes, and one or more leaf nodes. A root node is attached to other nodes (intermediate nodes and/or leaf nodes) that are directly beneath the root node. Intermediate nodes are attached to a node (root node or other intermediate node) that is directly above the intermediate node and to other nodes (intermediate nodes and/or leaf nodes) that are directly beneath the intermediate node. Leaf nodes are attached to a node (root node or intermediate node) that is directly above the leaf node. Decision logic may be contained at each root node and at each intermediate node and a response probability value may be contained at each leaf node. Response probability values represent a probability that an advertisement recipient will have a response to an advertisement. A response probability value may be a numeric value between zero and one. Zero may represent that an advertisement recipient will never respond to (0%) an advertisement. Conversely, one may represent that an advertisement recipient will always respond (100%) an advertisement. Response probability values may be decimal numeric values representing some percentage chance that an advertising recipient will respond to an advertisement. For example, a response probability value of 0.12 may represent a 12% chance that an advertising recipient will respond to an advertisement.

Responding to an advertisement may result when an advertising recipient manipulates an input device such as, for example, a keyboard or mouse to provide an indication that they wish to view the advertisement. "Clicking" on an advertisement with a mouse is one type of response. An advertising recipient may also respond by selecting a currently viewed advertisement when more information on an advertised product is desired. Further, an advertising recipient may respond by purchasing an advertised product. If a product is purchased "on-line" this information may be recorded into a database.

Figure 4:
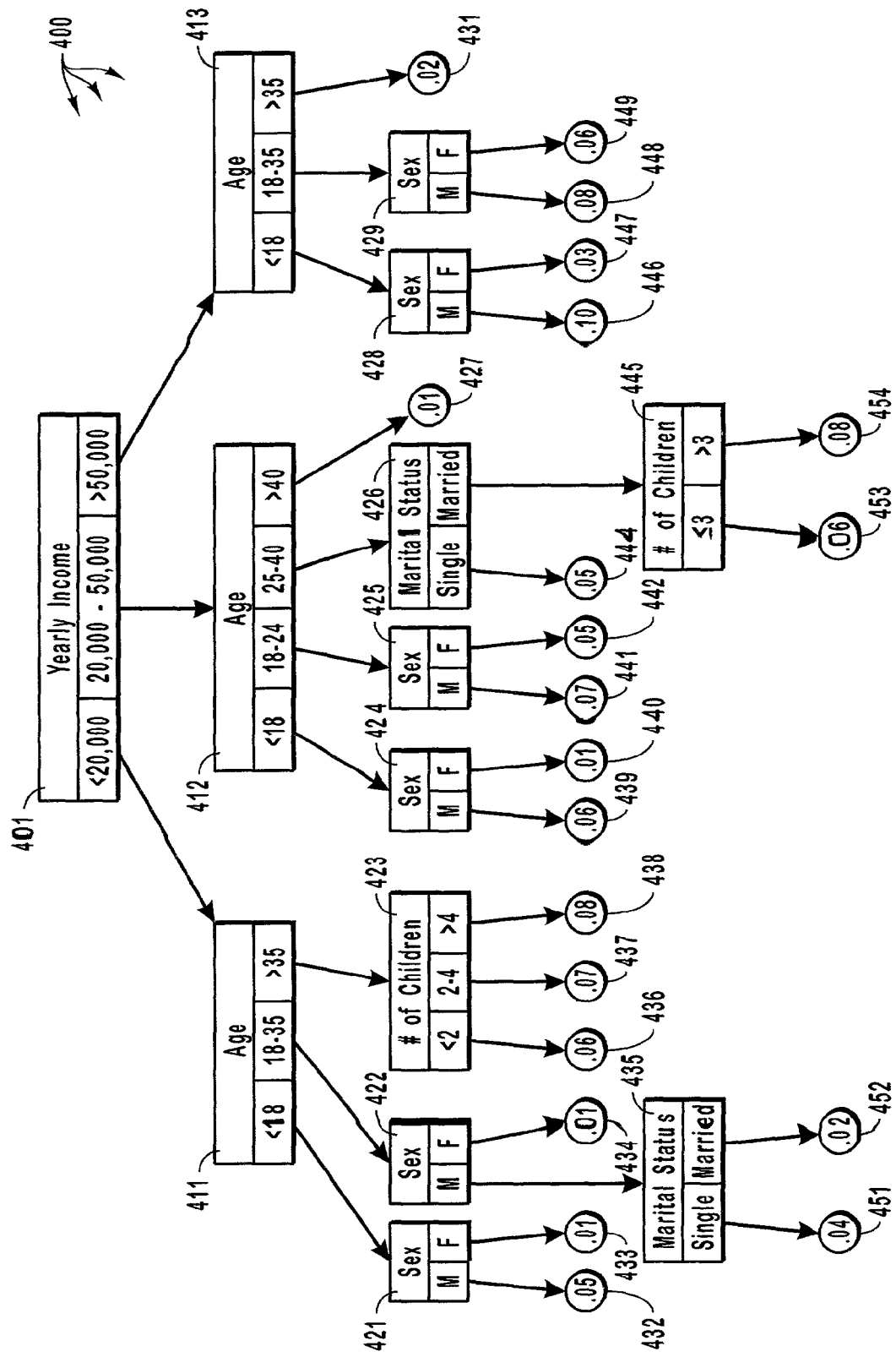
FIG. 4 illustrates an example of a decision tree.

Shown in FIG. 4 is an example of a decision tree, decision tree 400. Decision tree 400 includes root node 401, a plurality of intermediate nodes (e.g., intermediate nodes 411-413, 421-426, 428, 429, 435 and 445), each represented by rectangles and a plurality of leaf nodes (e.g., leaf nodes 432-434, 436-442, 444, 446-449 and 451-454), each represented by circles. Root node 401, as well as each intermediate node, contains decision logic that may cause nodes below the root node or intermediate node to be accessed. In decision tree 400, decision logic contained at root node 401 and at intermediate nodes is associated with observations about potential advertisement recipients.

It should be understood that the use of decision trees is merely an example of a probabilistic prediction model. However, use of a decision tree is not important to practicing the present invention. It would be apparent to one skilled in the art, after having reviewed this description, that a variety of different probabilistic prediction models may be used to practice the present invention. The present invention may be practiced with any model that takes advertisement recipient attributes and attribute values as inputs and provides a probability distribution that an advertisement recipient will respond to advertisements. Probabilistic prediction models include, for example, naive Bayes, logistic regression, generalized additive models, mixture models, and boosted versions of these classifiers. Likewise, it should be understood that the illustrated decision tree configuration is one of many possible configurations. However, the illustrated decision tree configuration is not important to practicing the present invention. It would be apparent to one skilled in the art, after having reviewed this description, that a variety of different decision tree configurations, including an inverted decision tree, may be used to practice the present invention.

Each advertisement in possible advertisements 210 may include a decision tree that is configured differently than the decision trees of other advertisements. For example, the decision trees 222, 232, and 242 may all be configured differently. Decision trees may be viewed as having different configurations when the nodes of the decision trees contain different decision logic and/or when the nodes of decision tress are arranged differently. Different decision tree configurations may be desired for advertisements of different products. For example, a first decision tree configuration may be desirable for automotive products and a second decision tree configuration may desirable for household products.

Step 304 may include a corresponding act of determining a response probability for each advertisement in the plurality of possible advertisements (act 302). For each advertisement, this may include traversing a corresponding decision tree to access a response probability contained in a leaf node of the decision tree. Decision logic of different decision trees may be utilized for different advertisements. For advertisements 220, 230, and 240 this may include traversing decision trees 222, 232, and 242 respectively. For example, for advertisement 230, decision tree 232 may be traversed to access a leaf node of decision tree 232.

Determining response probabilities may include referencing data associated with an advertising recipient ("recipient data"). Recipient data may include demographic data associated with an advertising recipient such as, for example, age, income, sex, marital status, number of children, etc. Recipient data may also include purchasing data such as, for example, a list of products an advertising recipient recently purchased, when they purchased the products, what price was paid for the products, etc. Recipient data may also include business data such as, for example, an advertising recipient's type of business, place of employment, position, and membership in organizations, etc. Recipient data may also include what web pages a recipient has accessed. It should be understood that these are merely examples of the types of recipient data that may be referenced. It would be apparent to one skilled in the art, after having reviewed this description, that a wide variety of types of recipient data, in addition to those described, may be utilized to practice the present invention.

Recipient data may be referenced from a user profile that contains recipient data. As shown in FIG. 2, probability determination module 261 may reference recipient data from user profile 250 via logical communication path 272. Probability module 261 may utilize the decision logic in decision trees along with the recipient data to calculate a response probability for each advertisement.

Recipient data may be in the form of readable text that is included in a user profile. Readable text representing an example of recipient data will be described with reference to FIG. 4. In the readable text example, when a sole period is encountered on three consecutive lines (i.e., a vertical ellipsis), this represents that other recipient data may precede the illustrated readable text or may follow the illustrated readable text. Numbers enclosed in brackets are line numbers and are included for informational purposes to aid in clarifying the description of the readable text.

[1] Name-John Doe
[2] Age-35
[3] Status-Married
[4] Income-43,000
[5] Children-1

[6] Employer-XYZ Corporation
[7] Position-Sales Manager

Decision tree 400 may be associated with one of the advertisements include in possible advertisements 210. Probability determination module 261 may utilize the decision logic contained in the root node and intermediate nodes of decision tree 400 along with the readable text recipient data to access a response probability contained in a leaf node of decision tree 400.

Root node 401 of decision tree 400 contains decision logic that makes a decision based on an advertising recipient's yearly income, if yearly income is less than $20,000, intermediate node 411 is accessed, if yearly income is between $20,000 and $50,000, intermediate node 412 is accessed, and if yearly income is greater than $50,000, intermediate node 413 is accessed. Line 4 of the recipient data includes the text "Income-43,000", this may represent that an advertising recipient's yearly income is $43,000. The decision logic of root node 401 may utilize this data to access intermediate node 412.

Intermediate node 412 contains decision logic that makes a decision based on an advertising recipient's age, if age is less than 18, intermediate node 424 is accessed, if age is between 18 and 24, intermediate node 425 is accessed, if age is between 25 and 40, intermediate node 426 is accessed, and if age is greater than 40, leaf node 427 is accessed. Line 2 of the recipient data includes the text "Age-34", this may represent that an advertising recipient is age 34. The decision logic of intermediate node 412 may utilize this data to access intermediate node 426.

Intermediate node 426 contains decision logic that makes a decision based on an advertising recipient's marital status, if single, leaf node 444 is accessed and if married, intermediate node 445 is accessed. Line 3 of the recipient data ncludes the text "Status-Married", this may represent that an advertising recipient is married. The decision logic of intermediate node 426 may utilize this data to access intermediate node 445.

Intermediate node 445 contains decision logic that makes a decision based on number of children, if three or less children leaf node 453 is accessed and if greater than three children leaf node 454 is accessed. Line 5 of the recipient data includes the text "Children-1", this may represent that an advertising recipient has one child. The decision logic of intermediate node 445 may utilize this data to access leaf node 453.

Leaf node 453 contains a response probability of "0.06". This response probability may represent a percentage that the advertisement associated with decision tree 400 will be "clicked on" or otherwise responded to. This response probability may indicate that a 34 year old, married advertisement recipient with $44,000 yearly income and one child has a 6% chance of responding to an advertisement associated with decision tree 400.

Probability determination module 261 may utilize the readable text recipient data (or may utilize other recipient data) and traverse other decision trees to access a response probability for each advertisement in possible advertisements 210. For example, decision tree 222 may be traversed to access a response probability for advertisement 220, decision tree 232 may be traversed to access a response probability for advertisement 230, decision tree 242 may be traversed to access a response probability for advertisement 240, etc.

A score associated with each of the possible advertisements may be altered based on the response probability for each of the possible advertisements (act 303). The scores may be the previously accessed scores, for example, scores 221, 231 and 232. As shown in FIG. 2, score alteration module 262 may receive advertisements 210 along with response probabilities calculated by probability determination module 261 via logical communication path 273. Score alteration module 262 may calculate a statistical mean probability value by iterating over the response probabilities contained in every leaf node of every decision tree associated with possible advertisements 210. The statistical mean value may represent an "average" response probability. The average can be a weighted average, where the weight for a leaf node is equal to the percentage of times that the leaf node is used to determine a response probability, or can be a simple average. If a non-decision-tree predictive model is used, such as, for example, naive Bayes or logistical regression, advertising computer system 260 may track response probabilities that are output and compute a simple average of those response probabilities. The deviation of a particular leaf node's probability from the mean probability may be indicative of how a score is to be altered. When simple averages are used the deviation may be represented by a simple standard deviation. Likewise, when weighted averages are used the deviation may be represented by a weighted standard deviation.

For example, if a particular probability of responding to an advertisement is below the mean probability, a score for an advertisement may be decreased. Thus, the chance of presenting an advertisement to a user may be decreased where the probability that the user will respond to the advertisement is below average. On the other hand, if a particular probability of responding to an advertisement is above the mean probability, a score for an advertisement may be increased. Thus, the chance of presenting an advertisement to a user may be increased where the probability that the user will respond to the advertisement is above average.

In some cases, advertisement scores may be increased or decreased through the use of multiplicative factors. Different ranges of deviation (e.g. some number of standard deviations from the mean) may result in different multiplicative factors being applied to a score. Multiplicative factors for altering a score may be calculated from values in a decision tree and/or may be user-configurable.

A group of pseudo-code instructions representing an example of instructions that may be utilized to perform score alteration will be described. In the illustrated group of pseudo-code instructions, score alteration is facilitated using simple averages and simple standard deviations. However, it should be understood that weighted averages and weighted standard deviations may be used to facilitate score alteration. A module, for example, score alteration module 262, may execute instructions similar to the group of pseudo-code instructions to alter the scores of advertisements.

The following description is illustrative only. It would be apparent to one skilled in the art, after having reviewed this description, that pseudo-code instructions may be implemented as computer-executable instructions using a wide variety of programming languages and programming techniques. In this pseudo-code description a sole period on three consecutive lines (i.e., a vertical ellipsis) represents that other instructions may precede the illustrated instructions or that other instructions may follow the illustrated instructions. Numbers enclosed in brackets are line numbers and are included for informational purposes to aid in clarifying the description of the instructions. Text preceded by two diagonal bars ("//") represents informational comments describing the pseudo-code.

```
[01]//means and stddevs are computed by iterating over each leaf node of every tree
[02]A=mean (log(response probability)) − 2*stddev(log(response probability))
[03]B=mean (log(response probability))
[04]C=mean (log(response probability)) + 2*stddev(log(response probability))
[05]
[06]min_factor=minimum multiplicative factor //set externally
[07]max_factor=maximum multiplicative factor //set externally
[08]
[09]//p(ad=respond is shorthand for p(ad=respond|observations for user)
[10]for each ad
[11] if log(p(ad=respond)) >= C then
[12]  new_score(ad)=max_factor* old_score(ad)
[13] elseif log(p(ad=respond)) <= A then
[14]  new_score(ad)=min_factor*old_score(ad)
[15] elseif log(p(ad=respond)) > B then
[16]  new_score(ad)=exp((log(p(ad=respond)) − B)/(C-B))*log(max_factor))* old_score(ad)
[17] elseif log(p(ad=respond)) < B then
[18]  new_score(ad)=exp((B − log(p(ad=respond)))/(B-A))*log(min_factor))*old_score(ad)
[19] endif
[20]endfor
```

Figure 5:
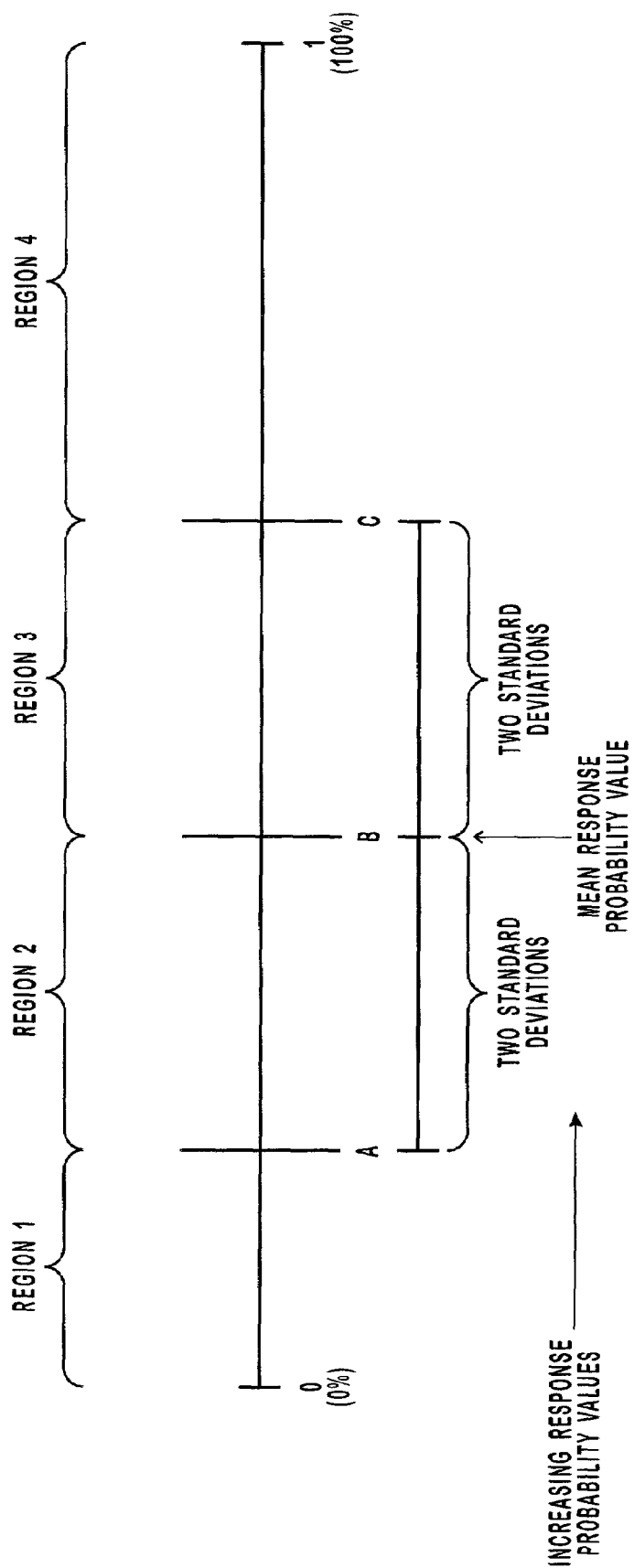
FIG. 5 illustrates an example of response probability values divided into different regions.

At line 03 the variable "B" is set equal to a value representing the statistical mean (hereinafter referred to as the "mean value") of the response probability values in every leaf node of every decision tree (hereinafter referred to as "all the response probability values"). At line 02 the variable "A" is set equal to a value representing the mean value of all the response probability values minus two standard deviations of all the response probability values. At line 04 the variable "C" is set equal to a value representing the mean values of all the response probability values plus two standard deviations of all the response probabilities. This essentially divides the range of all the response probability values into four regions. FIG. 5 is an example of how the values A, B, and C may divide a range of response probability values into different regions.

Shown in FIG. 5 is a range of response probabilities values with zero on the left and increasing to one on the right. In FIG. 5, zero represents a 0% chance that an advertisement will be responded to and 1 represents a 100% chance that an advertisement will be responded to. Thus, the response probability for each advertisement may fall somewhere within the range illustrated in FIG. 5.

Region 1 includes response probability values from zero up to and including A. Region 2 includes response probability values between A and B. Region 3 includes response probability values between B and C. Region 4 includes response probability values from and including C up to 1. The distance between A and B is two standard deviations and the distance between B and C is two standard deviations. Thus, any response probability value at least two standard deviations less than B will fall in the region 1. Likewise, any response probability value at least two standard deviations greater than C will fall in region 4. Any response probability value less than B, but not at least two standard deviations less than B, will fall in the region 2. Any response probability value greater than B, but not at least two standard deviations greater than B, will fall in the region 3.

At line 06 the variable "min_factor" is set equal to a minimum multiplicative factor. This minimum multiplicative factor represents a value that may be used to alter an advertisement score. The minimum multiplicative factor may be used to decrease advertisement scores that have a response probability value in the region with the lowest probability values (e.g. region 1 in FIG. 5). A user may configure the minimum multiplicative factor value externally. It may be that min_factor is set to a value less than one, thus reducing advertisement scores that are multiplied by min_factor.

At lines 07 the variable "max_factor" is set equal to a maximum multiplicative factor. This maximum multiplicative factor represents a value that may be used to alter an advertisement score. The maximum multiplicative factor may be used to increase advertisement scores that have a response probability value in the region with the highest probability values (e.g. region 4 in FIG. 5). A user may configure the maximum multiplicative factor value externally. It may be that max_factor is set to a value greater than one, thus increasing advertisement scores that are multiplied by max_factor.

The min_factor variable may be used to limit advertisement score reduction. That is, no advertisement score may be decreased to a value that is less than a product of the score multiplied by min_factor. The max_factor variable may be used to limit advertisement score increase. That is, no advertisement score may be increased to a value that is more than a product of the score multiplied by max_factor. The min_factor and max_factor variables may be included in intermediate values used to alter scores for advertisements that have response probability values in intermediate regions. For example, region 2 and region 3 in FIG. 5.

At line 10 the pseudo-code instruction "for each ad" indicates the beginning of a "for" loop that will be executed for each advertisement (e.g. each advertisement in possible advertisements 210). The pseudo-code instruction "endfor" at line 20 indicates the end of the "for" loop that begins at line 10. Taken together, lines 10 and 20 indicate that the pseudo-code instructions from line 11 through line 19 will be executed for each advertisement.

At line 11 through line 19 "p(ad=respond)" represents a response probability value for an advertisement. Such a response probability value may be a value that was contained in the leaf node of a decision tree.

At line 11, it is determined if a response probability value for an advertisement is greater than or equal to C (i.e. at least two standard deviations greater than B) and thus falls in region 4. When a response probability value falls in region 4, line 12 is executed. At line 12, an advertisement score is altered. A variable "new_score" is set equal to the product of max_factor multiplied by a variable "old_score". The variable old_score represents the score associated with an advertisement when the advertisement was initially received. For example, the scores 221, 231, and 241 as initially received by probability determination module 261. The new_score variable represents a new score that will be associated with the advertisement and that will replace the old_score. For example, altered score 223 may represent a new score for advertisement 220 and may replace score 221, which represents an old score. Since max_factor may be set to a value greater than one, the value of new_score may be greater than the value of old_score. Thus, an advertisement score may be increased when an associated response probability value falls in region 4.

At line 13 it is determined if a response probability value for an advertisement is less than or equal to A (i.e. at least two standard deviations less than B) and thus falls in region 3. When a response probability value falls in region 1, line 14 is executed. At line 14, an advertisement score is altered. The variable new_score is set equal to the product of min_factor multiplied by the variable old_score. Since min_factor may be set to a value less than one, the value of new_score may be less than the value of old_score. Thus, an advertisement score may be decreased when an associated response probability value falls in region 1.

At line 15 it is determined if a response probability value for an advertisement is greater than B. Since all response probability values greater than or equal to C satisfy the "if" statement at line 11, line 15 essentially represents an "if" statement with the condition that a response probability value be greater than B and less than C. Such response probability values would fall in region 3. When a response probability value falls in region 3, line 16 is executed. At line 16, an advertisement score is altered. The variable new_score is set equal to the product of the intermediate value [exp((log(p(ad=respond))-B)/(C-B))*log(max_factor))] multiplied by the variable old_score. This essentially results in old_score being multiplied by an intermediate value between one and max_factor. The intermediate value approaches one as a response probability value approaches B and the intermediate value approaches max_factor as a response probability value approaches C.

At line 16, the value of ((log(p(ad=respond)-B)/(C-B)) decreases as a response probability value approaches B. If a response probability value were to equal B, the value of ((log(p(ad=respond)-B)/(C-B)) would equal zero (i.e. ((B-B)/(C-B))). This results in an intermediate value of exp (0*log(max_factor)), which equals one. Thus, if a response probability for an advertisement were to equal B, new_score would equal the product of one multiplied by old_score.

On the other hand, the value of ((log(p(ad=respond)-B)/(C-B)) increases as a response probability value approaches C. If a response probability value were to equal C, the value of ((log(p(ad=respond)-B)/(C-B)) will equal one (i.e. ((C-B)/(C-B))). This results in an intermediate value of exp (1*log(max_factor)), which equals max_factor. Thus, if a response probability for an advertisement were to equal C, new_score would equal the product of max_factor multiplied by old score.

Thus, an advertisement score may be increased when an associated response probability value falls in region 3. However, it may be that the magnitude of an increase is less than the magnitude of an increase when response probability values fall in region 4.

At line 17 it is determined if a response probability value for an advertisement is less than B. Since all response probability values less than or equal to A satisfy the "if" statement at line 13, line 18 essentially represents an "if" statement with the condition that a response probability value be less than B and greater than A. Such response probability values would fall in region 2. When a response probability value falls in region 2, line 18 is executed. At line 18, an advertisement score is altered. The variable new_score is set equal to the product of [exp((B-log(p (ad=respond)))/(B-A))*log(min_factor))] multiplied by the variable old_score. This essentially results in old_score being multiplied by an intermediate value between min_factor and 1. The intermediate value approaches min_factor as a response probability value approaches A and the intermediate value approaches 1 as a response probability value approaches B.

The value of ((B-log(p(ad=respond)))/(B-A)) decreases as a response probability value approaches B. If a response probability value were to equal B, the value of ((B-log(p (ad=respond)))/(B-A)) would equal zero (i.e. ((B-B)/(B-A))). This results in an intermediate value of exp(0*log (min_factor)), which equals one. Thus, if a response probability for an advertisement were to equal B, new score would equal the product of one multiplied by old_score.

On the other hand, the value of ((B-log(p(ad=respond)))/ (B-A)) increases as a response probability value approaches A. If a response probability value were to equal A, the value of ((B-log(p(ad=respond)))/(B-A)) would equal 1 (i.e. ((B-A)/(B-A))). This results in an intermediate value of exp (1*log(min factor)), which equals min_factor. Thus, if a response probability for an advertisement were to equal A, new score would equal the product of min_factor multiplied by old_score.

Thus, an advertisement score to may be decreased when an associated response probability value falls in region 2. However, it may be that the magnitude of a decrease is less than the magnitude of a decrease when response probability values fall in region 1.

As illustrated by the pseudo-code instructions, there is no set of conditions for altering an advertisement response probability with a value equal to B. This may indicate a desire not to modify scores for advertisements that have an "average" (either simple or weighted) chance of being responded to.

In should be understood that the described pseudo-code instructions and the illustrated response probability regions in FIG. 5 are merely examples. It would be apparent to one skilled in the art, after having reviewed this description that a variety of different pseudo-code instructions may be implemented to create a variety of different response probability regions.

Advertisements that include altered scores may be output. Shown in FIG. 2, score alteration module 262 outputs possible advertisements 210 via logical communication path 274. Advertisements may be output to an advertisement database or to a module that is included in an advertisement pipeline. Logical communication path 274 may represent a portion of an advertisement pipeline.

In one alternate embodiment, the present invention is practiced to modify scores for content, such as, for example, content on the World Wide Web ("WWW"), based on response probabilities. A plurality of possible portions of Web content (e.g. Web pages) are accessed. Each portion of Web content is associated with a probabilistic prediction model. A response probability is determined for each portion of Web content in the plurality of possible portions of Web content. Responding to Web content includes any action taken by a recipient of the Web content that indicates the Web content recipient has shown some interest in the subject matter of the Web content. Similar to advertisements, this may include selecting a portion of Web content (e.g. a Web page) by clicking through to view more information about the subject matter of the Web content. Based on the response probability for each of the possible portions of Web content, a score associated with each of the possible portions of Web content are altered.

Modifying advertisement scores based on response probabilities increases the chances of presenting advertisements a user will respond to and decreases the chances of presenting advertisements a user will not respond to. This promotes conservation of resources in computer systems that present advertisements, as there is a decreased chance such resources will be used to present advertisements that will not be responded to. Further, the chances of presenting undesirable advertisements to a user are also decreased.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In a network environment that includes at least an advertisement computer system, a method for modifying advertisement scores based on advertisement response probabilities and targeting advertisements to users based on a probability that a user will respond to possible advertisements, comprising the following:
   receiving a request to display a page of web content to a recipient, the page of web content including an advertisement portion which is dynamically variable to include advertising content selected based at least in part on a probability that the recipient will respond to a selected advertisement;
   accessing a plurality of possible advertisements available for selection to be inserted into the advertisement portion;
   receiving a base score for each of the plurality of possible advertisements; receiving a probability prediction model for each of the plurality of possible advertisements, such that each of the plurality of possible advertisements has a different corresponding probability prediction model, and wherein the probability prediction model for each of the plurality of possible advertisements includes a plurality of response probabilities;
   for each of the plurality of possible advertisements, selecting one of the plurality of response probabilities included in the corresponding probability prediction model;
   calculating an average response probability, wherein the average response probability is based on each of the plurality of response probabilities from each of the different probability prediction models; and
   for the plurality of possible advertisements, altering the base score of the corresponding possible advertisements based on an amount by which the selected response probability for each respective possible advertisement deviates from the average response probability, wherein altering the base score for each possible advertisement comprises:
      applying a first multiplicative factor to all base scores corresponding to the possible advertisements having a selected response probability greater than the average response probability plus a predetermined number of standard deviations of the selected response probabilities, wherein applying the first multiplicative factor increases the corresponding scores; and
      applying a second multiplicative factor to all base scores corresponding to the possible advertisements having a selected response probability less than the average response probability minus the predetermined number of standard deviations of the selected response probabilities, wherein the second multiplicative factor decreases the corresponding scores.

2. The method as recited in claim 1, wherein accessing a plurality of possible advertisements includes accessing the plurality of possible advertisements from an advertisement database.

3. The method as recited in claim 1, wherein accessing a plurality of possible advertisements includes accessing the plurality of possible advertisements from an advertisement pipeline.

4. The method as recited in claim 1, wherein the plurality of different probability prediction models include a different decision tree for each of the plurality of possible advertisements.

5. The method as recited in claim 4, wherein each decision tree includes the plurality of response probabilities only at leaf nodes.

6. The method as recited in claim 4, wherein each decision tree includes a base node, a plurality of intermediate nodes, and a plurality of leaf nodes, wherein each of the nodes corresponds to a different recipient attribute.

7. The method as recited in claim 6, wherein only the leaf nodes include response probabilities, and wherein each leaf node contains at least one response probability.

8. The method as recited in claim 4, wherein selecting one of the plurality or response probabilities includes traversing the decision tree corresponding to each possible advertisement to reach a leaf node that contains the selected response probability.

9. The method as recited in claim 1, wherein the plurality of different probability prediction models include at least one naïve Bayes predictive model.

10. The method of claim 1, wherein the plurality of different probability prediction models include at least one logical regression predictive model.

11. The method of claim 1, wherein selecting one of the plurality of response probabilities for each of the plurality of possible advertisements includes selecting the one response probability corresponding to an attribute value associated with the recipient.

12. The method of claim 1, wherein each of the plurality of response probabilities reflects a probability a user will click on a respective advertisement.

13. The method of claim 1, wherein each of the plurality of response probabilities reflects a probability a user will buy on a product advertised in a respective advertisement.

14. The method of claim 1, wherein altering the corresponding base score for the plurality of possible advertisement comprises increasing base scores of advertisements having a response probability greater than the average response probability.

15. The method of claim 1, wherein the average is a weighted average based on a percentage of times a leaf node is used to select a response probability.

16. The method of claim 1, wherein altering the corresponding base score for the plurality of possible advertisement comprises decreasing base scores of advertisements having a response probability less than the average response probability.

17. The method of claim 1, wherein altering the base score for the possible advertisements further comprises altering the base score for possible advertisements between the average response probability plus the predetermined number of standard deviations of the selected response probabilities and the average response probability minus the predetermined number of standard deviations of the selected response probabilities by an amount proportional to the deviation of the corresponding selected response value from the average response value.

18. The method of claim 1, wherein the predetermined number of standard deviations is one.

19. The method of claim 1, wherein the predetermined number of standard deviations is two.

20. The method of claim 1, wherein the standard deviation is a weighted standard deviation based on a weighted average response probability.

21. The method of claim 1, further comprising:
selecting one of the possible advertisements, the selected one of the possible advertisements having the highest altered score; and
inserting the selected one of the possible advertisements into the advertisement portion of the page of web content.

22. The method of claim 1, wherein receiving the base score for each of the possible advertisements includes accessing a base score stored with its corresponding possible advertisement.

23. The method of claim 1, wherein receiving a probability prediction model for each of the plurality of possible advertisements includes accessing a probability prediction model stored with its corresponding possible advertisement.

24. A computer program product for use in a network environment that includes at least an advertisement computer system, the computer program product comprising one or more computer-readable media having stored thereon computer executable instructions for performing the method of claim 1.

25. A network system comprising:
an advertisement computer system, the advertising computer system having access to computer executable instructions that, when executed by the advertisement computer system, perform the method of claim 1.

26. A network system as recited in claim 25, wherein the computer executable instructions further cause the advertisement computer system to select one of the plurality of possible advertisements to be presented to the recipient.

27. A network system as recited in claim 25, further comprising a user computer system having access to computer executable instructions that, when executed by the user computer system, cause the user computer system to display the selected one of the plurality of possible advertisements to the recipient.

* * * * *